(12) United States Patent
Naka (10) Patent No.: US 10,097,763 B2
(45) Date of Patent: Oct. 9, 2018

(54) ELECTRONIC DEVICE AND METHOD OF CONTROLLING THE SAME

(71) Applicant: CANON KABUSHIKI KAISHA, Tokyo (JP)

(72) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/423,672

(22) Filed: Feb. 3, 2017

(65) Prior Publication Data

US 2017/0230582 A1 Aug. 10, 2017

(30) Foreign Application Priority Data

Feb. 5, 2016 (JP) ................................ 2016-021235

(51) Int. Cl.
*H04N 5/232* (2006.01)
*G03B 13/02* (2006.01)

(52) U.S. Cl.
CPC ......... *H04N 5/23293* (2013.01); *G03B 13/02* (2013.01)

(58) Field of Classification Search
None
See application file for complete search history.

(56) References Cited

U.S. PATENT DOCUMENTS

| 2008/0055453 | A1* | 3/2008 | Battles | .................. | G03B 13/02 348/333.05 |
| 2010/0315521 | A1* | 12/2010 | Kunishige | .............. | H04N 5/232 348/220.1 |
| 2013/0329110 | A1* | 12/2013 | Yoshida | ............. | H04N 5/23293 348/333.02 |
| 2014/0071326 | A1* | 3/2014 | Jang | ................... | H04N 5/23241 348/333.11 |
| 2014/0211037 | A1* | 7/2014 | Lee | .................... | H04N 5/23293 348/222.1 |
| 2014/0347542 | A1* | 11/2014 | Ichikawa | ........... | H04N 5/23293 348/333.02 |
| 2016/0028939 | A1* | 1/2016 | Ogawa | ............... | H04N 5/23293 348/346 |
| 2016/0191818 | A1* | 6/2016 | Matsushima | ....... | H04N 5/2621 386/224 |
| 2016/0291861 | A1* | 10/2016 | Song | .................. | G06F 3/04845 |

(Continued)

FOREIGN PATENT DOCUMENTS

JP 10-191119 A 7/1998

*Primary Examiner* — W B Perkey
(74) *Attorney, Agent, or Firm* — Cowan, Liebowitz & Latman, P.C.

(57) ABSTRACT

An electronic device comprises an imaging unit configured to capture image and an operation unit configured to receive a first operation to adjust a shooting setting for capturing image and a second operation to capture image based on the shooting parameter and write data based on the captured image in a recording medium. The electronic device displays, on a screen, image review based on the captured image after capturing image in response to the second operation and then displays live view which is generated by continuously capturing image. A period of displaying the image review is shorter if the first operation is detected successively after finishing detecting the second operation than if the first operation is not detected successively after finishing detecting the second operation.

10 Claims, 8 Drawing Sheets

(56) References Cited

U.S. PATENT DOCUMENTS

2016/0381281 A1* 12/2016 Ueguri ............... H04N 5/23212
　　　　　　　　　　　　　　　　　　　　　　　　　348/333.02
2017/0230582 A1* 8/2017 Naka ................. H04N 5/23293

* cited by examiner

ELECTRONIC DEVICE AND METHOD OF CONTROLLING THE SAME

BACKGROUND OF THE INVENTION

Field of the Invention

The present invention relates to an electronic device for performing live view display that provides a viewfinder function and image review display used to confirm a shot still image, and a method of controlling the same.

Description of the Related Art

In general, an imaging apparatus such as a digital camera has a live view mode to continuously through-display shot images on a display unit such as an LCD and an image review mode to display a still image obtained by shooting immediately after a shooting operation by a user. The live view allows the user to preview framing before shooting. Also, the image review allows the user to check a shot image immediately after shooting.

A switch for the shooting operation is generally configured to generate instructions in two steps, that is, in a shooting standby process performed to decide a subject and decide and lock exposure and focusing and in a shooting instruction operation of executing an actual shooting process. For example, as the switch for the shooting operation, a shutter button that generates a signal in each of a half stroke and a full stroke is used. In this case, the shooting standby operation is assigned to the half stroke of the shutter button. When the shutter button is pressed halfway, for example, focusing on a subject is performed, or exposure is locked. The shooting instruction operation is assigned to the full stroke of the shutter button. When the shutter button is pressed all the way down, shooting is performed, and an image obtained by the shooting is recorded in a recording medium. In this imaging apparatus, the shooting instruction operation is repeated while keeping the lock state by the shooting standby operation, thereby continuously performing shooting process under the same exposure/focus condition.

Additionally, in general, the imaging apparatus is configured to display a live view or an image review for shooting confirmation on one display unit. There also exists an imaging apparatus that reduces image review display and superimposes it on live view display. In the reduced image review display, however, it is difficult and inconvenient to confirm a shot image in detail. For this reason, a general imaging apparatus alternately performs image review display and live view display on one display unit by, for example, displaying an image review during a predetermined period after shooting and then displaying a live view. Additionally, this imaging apparatus can execute the view display in accordance with the user's taste by a function of turning off the image review display or setting the display time of the image review display.

Japanese Patent Laid-Open No. 10-191119 describes an imaging apparatus performs displaying image review for a few seconds if a release switch is not pressed halfway after pressing the release switch completely. And displaying live view is performed if the release switch is pressed halfway after pressing the release switch completely.

However, in the imaging apparatus of Japanese Patent Laid-Open No. 10-191119, if the shooting standby operation is kept in response to pressing the release switch halfway after shooting, the image review is not displayed. Hence, the user cannot quickly check whether the shot image is as intended. On the other hand, if the shooting standby operation is kept after shooting, and the image review is displayed for a few seconds as usual, the user cannot see the live view during displaying the image review and cannot check the subject for the next shooting.

SUMMARY OF THE INVENTION

One aspect of the present invention provides display control that allows a user to quickly check a subject for the next shooting even when displaying image review for check of a shot image while keeping the shooting standby operation after shooting.

According to one aspect of the present invention, there is provided an electronic device comprising: an imaging unit configured to capture image; an operation unit configured to receive a first operation to adjust a shooting setting for capturing image and a second operation to capture image based on the shooting parameter and write data based on the captured image in a recording medium; and a display control unit configured to display, on a screen, image review based on the captured image after capturing image in response to the second operation and then display live view which is generated by continuously capturing image, wherein a period of displaying the image review is shorter if the first operation is detected successively after finishing detecting the second operation than if the first operation is not detected successively after finishing detecting the second operation.

According to another aspect of the present invention, there is provided a method of controlling an electronic device including an imaging unit configured to capture image, the method comprising: receiving, via an operation unit, a first operation to adjust a shooting setting for capturing image; receiving, via the operation unit, a second operation to capture image based on the shooting parameter and write data based on the captured image in a recording medium; and displaying, on a screen, image review based on the captured image after capturing image in response to the second operation and then display live view which is generated by continuously capturing image, wherein a period of displaying the image review is shorter if the first operation is detected successively after finishing detecting the second operation than if the first operation is not detected successively after finishing detecting the second operation.

Further features of the present invention will become apparent from the following description of exemplary embodiments (with reference to the attached drawings).

DESCRIPTION OF THE EMBODIMENTS

A preferred embodiment of the present invention will now be described with reference to the accompanying drawings.

Figure 1:
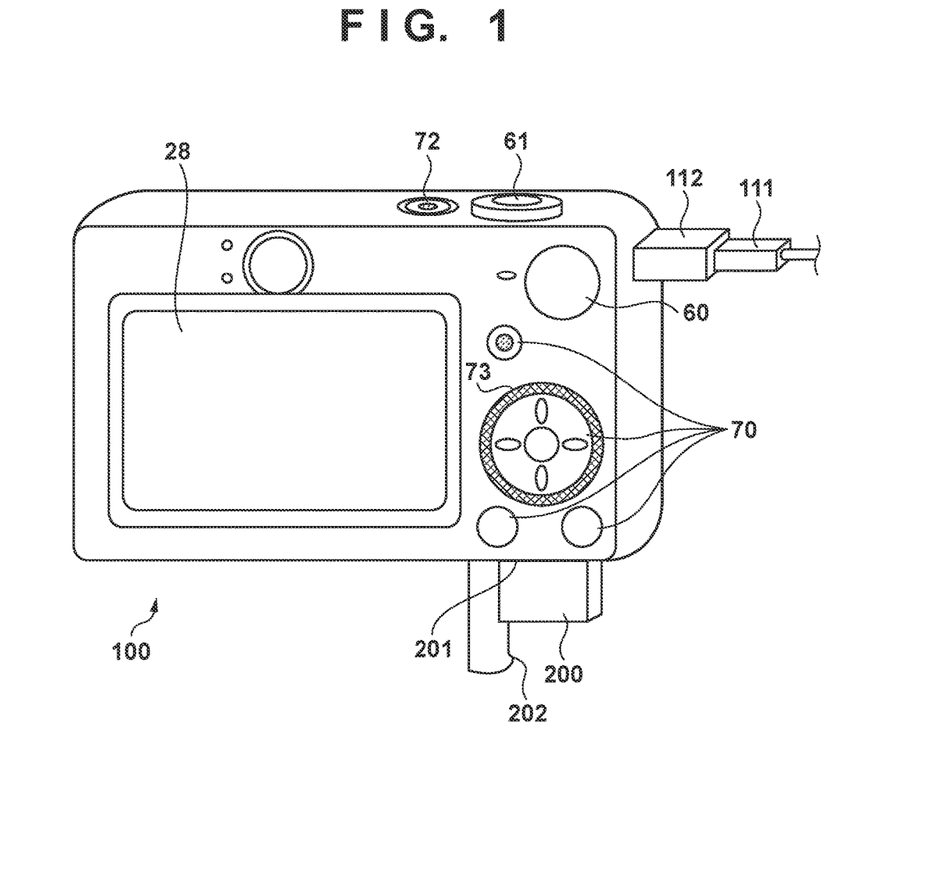
FIG. 1 is a view showing the outside of an imaging apparatus according to the embodiment.

FIG. 1 illustrates outside of a digital camera 100 as an example of an imaging apparatus according to the embodiment. A display unit 28 includes, for example, an LCD and displays a shot image or various kinds of information. A shutter button 61 is an operation member configured to receive a shooting standby operation for instructing to start shooting standby process by an imaging unit 22 (FIG. 2) and a shooting instruction operation for instructing to start shooting process. The half stroke of the shutter button 61 is assigned to the shooting standby operation, and the full stroke is assigned to the shooting instruction operation. A mode changeover switch 60 is an operation member used to switch various kinds of modes. A connector 112 connects a connection cable 111 used to connect an external device such as a personal computer or a printer. An operation unit 70 includes various kinds of switches, buttons, a touch panel, and the like to receive various kinds of operations from the user. A controller wheel 73 is a rotatable operation member included in the operation unit 70. A power switch 72 is a push button used to switch between power on and power off.

A recording medium 200 is a recording medium such as a memory card or a hard disk. A recording medium slot 201 is a slot used to store the recording medium 200. The recording medium 200 stored in the recording medium slot 201 can communicate with the digital camera 100. The digital camera 100 can thus record image data in the recording medium 200 or read and play back an image recorded in the recording medium 200. A lid 202 is the lid of the recording medium slot 201. FIG. 1 illustrates a state in which the lid 202 is opened, and the recording medium 200 is extracted from the recording medium slot 201 and partially exposed.

Figure 2:
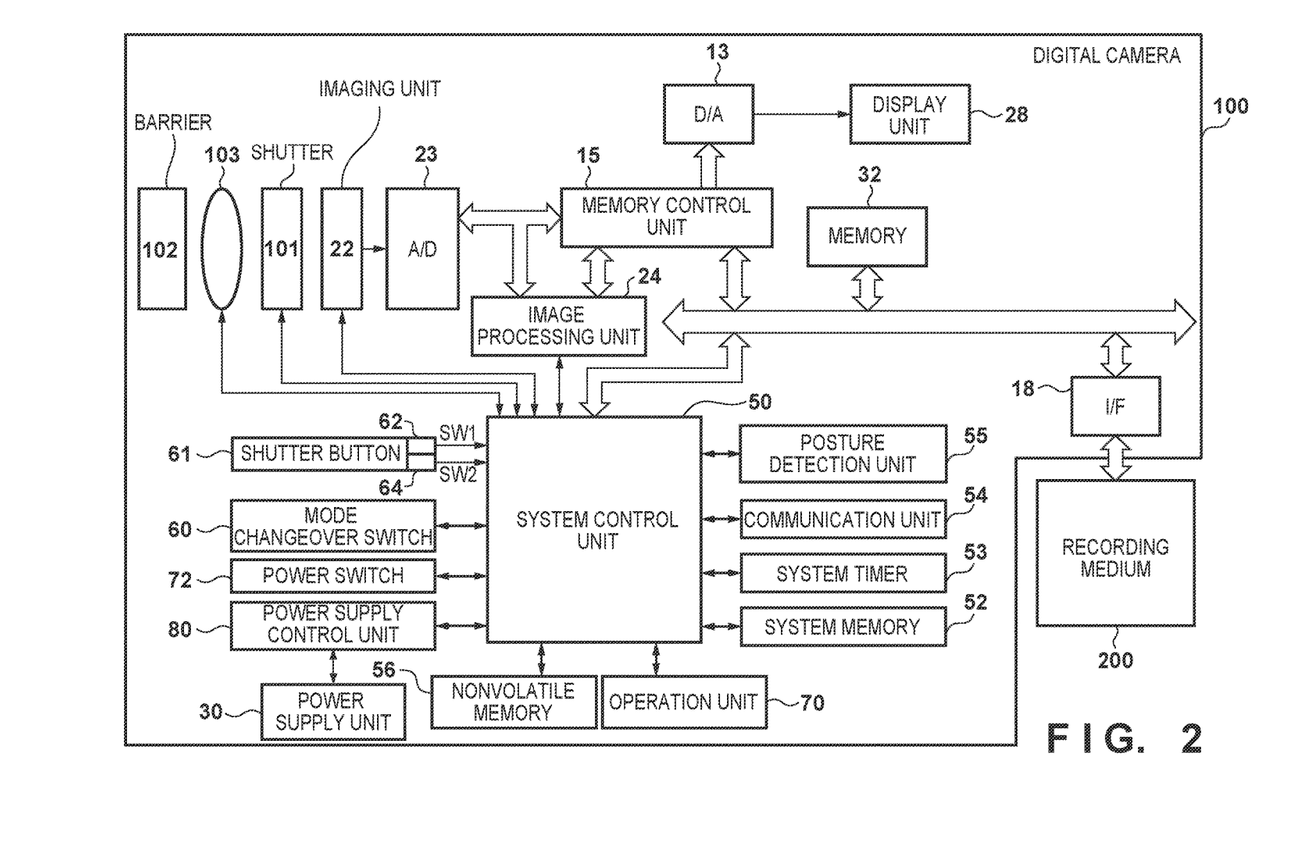
FIG. 2 is a block diagram showing an example of the arrangement of the imaging apparatus according to the embodiment.

FIG. 2 is a block diagram showing an example of the arrangement of the digital camera 100 according to the embodiment. Referring to FIG. 2, a photographing lens 103 is a lens group including a zoom lens and a focus lens. A shutter 101 has a shutter function and a stop function. The imaging unit 22 includes an image sensor formed from a CCD or CMOS element and converts an optical image into an electrical signal. An A/D converter 23 converts an analog signal output from the imaging unit 22 into a digital signal. A barrier 102 covers an imaging system including the photographing lens 103, the shutter 101, and the imaging unit 22, thereby preventing any dirt and damage to the imaging system.

An image processing unit 24 performs resize (pixel interpolation processing or reduction processing) processing or color conversion processing for data from the A/D converter 23 or data from a memory control unit 15. The image processing unit 24 also performs predetermined arithmetic processing using shot image data. Based on an arithmetic result obtained by the arithmetic processing, a system control unit 50 performs exposure control, distance measurement control, and white balance control. AF (Auto Focus) processing, AE (Auto Exposure) processing, EF (Electronic pre-Flash) processing, and AWB (Auto White Balance) processing by the TTL (Through The Lens) method are thus implemented.

Output data from the A/D converter 23 is written in a memory 32 via the image processing unit 24 and the memory control unit 15 or via the memory control unit 15. The memory 32 stores image data obtained by the imaging unit 22 and converted into digital data by the A/D converter 23 or image data to be displayed on the display unit 28. The memory 32 has a storage capacity enough to store a predetermined number of still images or a movie and audio of a predetermined time.

The memory 32 also serves as a memory (video memory) for image display. A D/A converter 13 converts data for image display stored in the memory 32 into an analog signal and supplies it to the display unit 28. The image data for display written in the memory 32 is thus displayed on the display unit 28 via the D/A converter 13.

The display unit 28 performs display according to an analog signal from the D/A converter 13 on the display device such as an LCD. When a digital signal temporarily A/D-converted by the A/D converter 23 and accumulated in the memory 32 is converted into an analog signal by the D/A converter 13 and sequentially transferred to the display unit 28, the display unit 28 displays a live view. By displaying such a live view, the display unit 28 functions as an electronic viewfinder.

The imaging unit 22 operates in a plurality of operation modes such as full-pixel readout drive for movie recording, low speed thinning readout continuous drive for live view display, and high speed thinning readout continuous drive for an auto focus operation in accordance with the purpose. The system control unit 50 selectively uses these operation modes of the imaging unit 22 in accordance with the operation state of the digital camera 100.

A nonvolatile memory 56 is a memory serving as an electrically erasable/recordable recording medium, and for example, an EEPROM is used. The nonvolatile memory 56 stores constants, programs, and the like for the operation of the system control unit 50. Here, the programs are computer programs configured to execute various kinds of flowcharts to be described later in the embodiment.

The system control unit 50 controls the entire digital camera 100. The system control unit 50 executes a program stored in the nonvolatile memory 56, thereby implementing each processing according to the embodiment to be described later. A system memory 52 is formed from a RAM to which constants and variables for the operation of the system control unit 50 and a program and the like read from the nonvolatile memory 56 are loaded. The system control unit 50 also performs display control to control the memory 32, the D/A converter 13, the display unit 28, and the like.

A system timer 53 measures the time used for various kinds of control or the time of an internal clock. The mode changeover switch 60, the shutter button 61, and the operation unit 70 input various kinds of operation instructions from the user to the system control unit 50. The mode changeover switch 60 switches the operation mode of the digital camera 100 to one of a still image shooting mode, a movie shooting mode, a playback mode, and the like. Modes included in the still image shooting mode are an auto shooting mode, an auto scene discrimination mode, a manual mode, various kinds of scene modes for defining shooting settings on a shooting scene basis, a programmed AE mode, a custom mode, and the like. The mode changeover switch 60 can directly switch the operation mode to one of these modes included in the still image shooting mode. Alternatively, the operation mode may be switched to the still image shooting mode by the mode changeover switch 60 and then switched to one of the above-described modes included in the still image shooting mode using another operation member. Similarly, the movie shooting mode may also include a plurality of modes.

A first shutter switch 62 is turned on by pressing the shutter button 61 provided on the digital camera 100 halfway, that is, by so-called half stroke (shooting standby operation), and generates a first shutter switch signal SW1. According to detection of the first shutter switch signal SW1, the system control unit 50 starts shooting standby process such as AF (Auto Focus) processing, AE (Auto Exposure) processing that sets shutter speed and aperture, AWB (Auto White Balance) processing, and EF (Electronic pre-Flash) processing. A second shutter switch 64 is turned on by pressing the shutter button 61 all the way down, that is, by so-called full stroke (shooting instruction operation), and generates a second shutter switch signal SW2. According to detection of the second shutter switch signal SW2, the system control unit 50 starts shooting process which includes reading image from the imaging unit 22 and write image data in the recording medium 200.

The operation members of the operation unit 70 are appropriately assigned functions on a scene basis and act as various kinds of function buttons by selectively operating various kinds of function icons displayed on the display unit 28. Examples of the function buttons are an end button, a return button, an image feed button, a jump button, a narrow-down button, and an attribute change button. For example, when a menu button is pressed, a menu screen capable of doing various kinds of settings is displayed on the display unit 28. The user can intuitively make various kinds of settings using the menu screen displayed on the display unit 28, a SET button, and four direction buttons that is, up, down, left, and right buttons.

The controller wheel 73 (FIG. 1) is a rotatable operation member included in the operation unit 70 and is used together with the direction buttons to, for example, instruct a selected item. When the controller wheel 73 is rotated, an electrical pulse signal is generated in accordance with the operation amount. By the pulse signal, the system control unit 50 can determine the angle of the rotation of the controller wheel 73 and the number of rotations. The system control unit 50 controls the units of the digital camera 100 based on the pulse signal. Note that the controller wheel 73 can be any member as long as it is an operation member whose rotation can be detected. For example, the controller wheel 73 may be a dial operation member which rotates by itself in accordance with the user's rotation operation and generates a pulse signal. The controller wheel 73 may be an operation member formed from a touch sensor, and the rotation of a user's finger or the like on the controller wheel 73 may be detected, instead of rotating the controller wheel 73 itself.

A power supply control unit 80 comprises a battery detection circuit, a DC/DC converter, and a switch circuit configured to switch a block to be energized. The power supply control unit 80 can detect the presence/absence of mounting of a battery, and the type and battery level of the mounted battery (power supply unit 30). Based on the detection result and an instruction from the system control unit 50, the power supply control unit 80 controls the DC/DC converter and supplies a necessary voltage to the units including the recording medium 200 for a necessary period. The power supply unit 30 is formed from a primary battery such as an alkali battery or a lithium battery, a secondary battery such as a NiCd battery, an NiMH battery, or an Li ion battery, an AC adapter, or the like.

A recording medium I/F 18 is an interface to the recording medium 200 such as a memory card or a hard disk. The recording medium 200 is a recording medium such as a memory card for recording a shot image, and is formed from a semiconductor memory, an optical disk, a magnetic disk, or the like.

A communication unit 54 is connected wirelessly or via a cable and transmits/receives a video signal, an audio signal, and the like. The communication unit 54 can also be connected to a wireless LAN (Local Area Network) or the Internet. The communication unit 54 can transmit an image (including a through image) shot by the imaging unit 22 or an image recorded in the recording medium 200 to an external device. The communication unit 54 can also receive image data and various kinds of information from the external device.

A posture detection unit 55 detects the posture of the digital camera 100 with respect to the direction of gravity. Based on the posture detected by the posture detection unit 55, the system control unit 50 can determine whether the image shot by the imaging unit 22 is an image shot by holding the digital camera 100 horizontally or vertically. The system control unit 50 can add direction information according to the posture detected by the posture detection unit 55 to the image file of the image shot by the imaging unit 22, or can rotate the image and record it. As the posture detection unit 55, an acceleration sensor or a gyro sensor is usable.

The live view display and image review display operations of the digital camera 100 according to the embodiment will be described next with reference to FIGS. 3 to 7. On the digital camera 100, the user can select three types of image review display settings "off", "2 sec", and "quick". The operation specifications after shooting change depending on the selected contents of the image review display setting. Details will be described later with reference to FIGS. 4A and 4B, and the like. The digital camera 100 according to the embodiment has two types of image review display modes, that is, simple review display and main review display to be described below.

In still image shooting, still image data read from the imaging unit 22 is converted into digital data by the A/D converter 23, sequentially developed by the image processing unit 24, and recorded in the memory 32. In the data development process, the image processing unit 24 generates image data for image review display. That is, the image processing unit 24 records developed data and simultaneously records display image data converted into an image format for the image review display in the memory 32. Hence, the recording of developed data and the recording of display image data progress almost simultaneously with the reading of the signal from the imaging unit 22. In simple review display, the display image data is displayed on the display unit 28. The image processing unit 24 also performs noise removal processing and more specific image quality adjustment for the developed data recorded in the memory 32, thereby JPEG-encoding the data. In main review display, the thus obtained JPEG-encoded data is reconstructed to an image, thereby generating image data for image review display and displaying it on a screen of the display unit 28.

The digital camera 100 according to the embodiment repeats the shooting instruction operation while keeping the lock state by the shooting standby operation, thereby performing continuous shooting of continuously performing shooting under the same exposure/focus condition. To determine whether the user has an intention to do such continuous shooting, the system control unit 50 determines whether the shooting standby operation is in a hold state. If the shooting standby operation is kept even after a predetermined time from finishing the shooting instruction operation after the start of shooting, the hold state of the shooting standby operation is detected. In this embodiment, if the off state of the first shutter switch 62 is not detected during a predetermined time after the second shutter switch 64 is turned off, the first shutter switch 62 is determined to be in the hold state.

Figure 3:
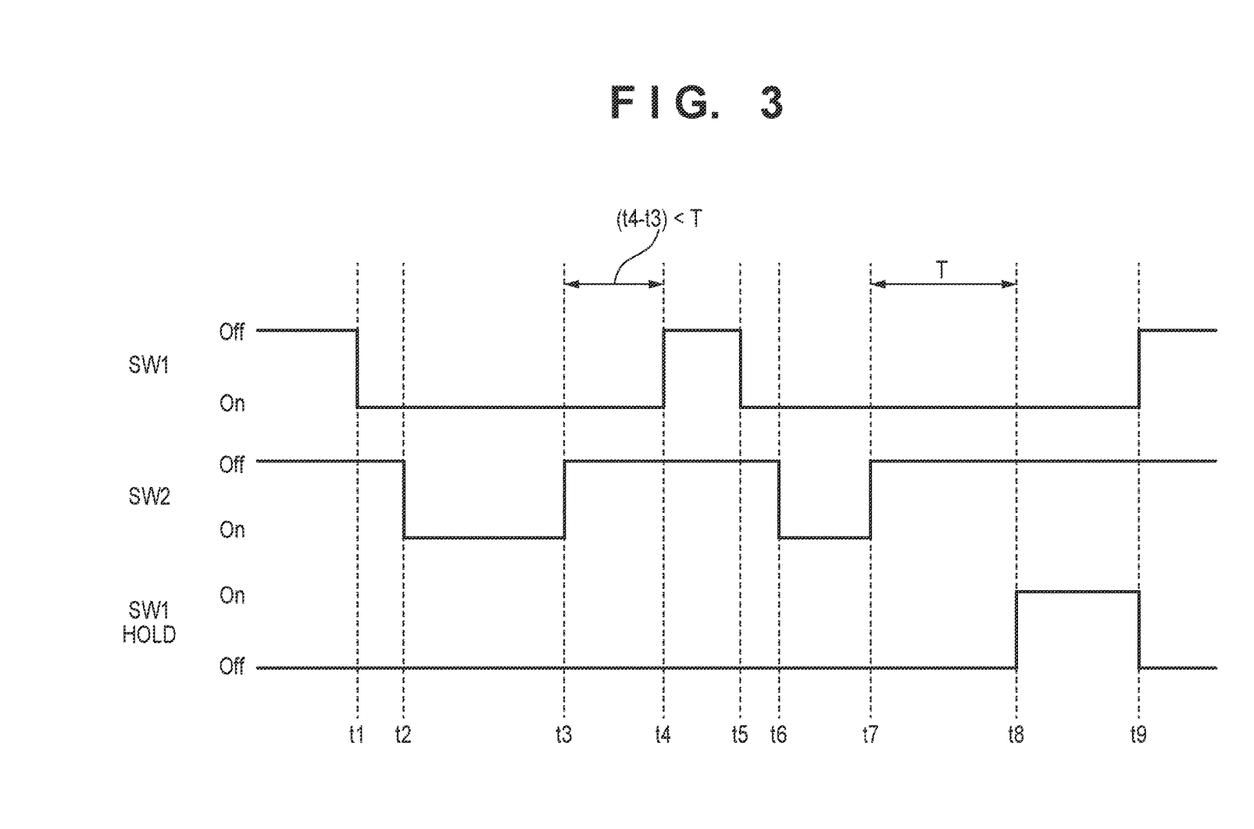
FIG. 3 is a timing chart showing the operation detection method of the imaging apparatus according to the embodiment.

FIG. 3 is a timing chart for explaining detection of the hold state of the first shutter switch (SW1). The operation from times t1 to t4 shows an example in which the half stroke (SW1) of the shutter button 61 is released in a short time after shooting. When the shutter button 61 is pressed halfway (SW1 is turned on) at time t1, the shooting standby process such as AF and AE is performed.

When the shutter button 61 is pressed all the way down (SW2 is turned on) at time t2, the digital camera 100 performs shooting (exposure). Assume that at time t3, the full stroke of the shutter button 61 is released (SW2 is turned off), and the half stroke state is held (SW1 is ON). At time t3, to determine whether the ON state of the first shutter switch 62 continues for a predetermined time T or more, the system control unit 50 starts time measurement by the system timer 53. Note that if the exposure started at time t2 ends, and the preparation for the image review ends, the system control unit 50 starts the image review without waiting for the release of SW2 (if the image review setting is a setting other than "off").

If the half stroke of the shutter button 61 is released (SW1 is turned off) at time t4, the period from times t3 to t4 is shorter than the predetermined time T (for example, 200 msec), and therefore, it is not determined that the state in which SW1 is held is attained. If it is not determined that the state in which SW1 is held is attained, the image review display is performed until a predetermined set time elapses. When the predetermined set time elapses, the live view display is started.

The operation from times t5 to t9 shows an example in which the user continues the half stroke of the shutter button 61 after shooting without releasing it, and the hold state of the first shutter switch 62 (SW1) is thus detected. When the shutter button 61 is pressed halfway (SW1 is turned on) at time t5, the system control unit 50 performs the shooting standby process such as AF and AE. When the shutter button 61 is pressed all the way down (SW2 is turned on) at time t6, the system control unit 50 performs shooting (exposure). If the exposure ends, and the preparation for the image review ends, the system control unit 50 starts the image review (if the image review setting is a setting other than "off").

Assume that at time t7, the full stroke of the shutter button 61 is released (SW2 is turned off), and the half stroke state is held (SW1 is ON). To determine whether the ON state of the first shutter switch 62 continues for the predetermined time T or more from time t7, the system control unit 50 starts time measurement by the system timer 53. Display at this time is the image review display if the set time has not elapsed. When the set time has elapsed, the live view is started.

If the time measured by the system timer 53 reaches the predetermined time T without the release of the half stroke of the shutter button 61 (time t8), the system control unit 50 determines that SW1 is in the hold state, and turns on the SW hold flag. Accordingly, if the image review is being executed, the system control unit 50 interrupts it and switches the display content to the live view while holding the shooting setting adjusted by the shooting standby operation performed at times t5 to t6 (while keeping AF and AE locked). This allows the user to decide framing while seeing the live view and perform shooting by applying the result of the shooting standby process performed at times t5 to t6.

If the shutter button 61 is set in the full stroke between times t8 and t9 (SW2 is turned on), still image shooting is executed. If the half stroke of the shutter button 61 is released at time t9 (SW1 is turned off), the system control unit 50 determines that the SW hold state is released, and turns off the SW hold flag. The lock of the result of the shooting standby operation performed at times t5 to t6 is also released.

Figure 4A:
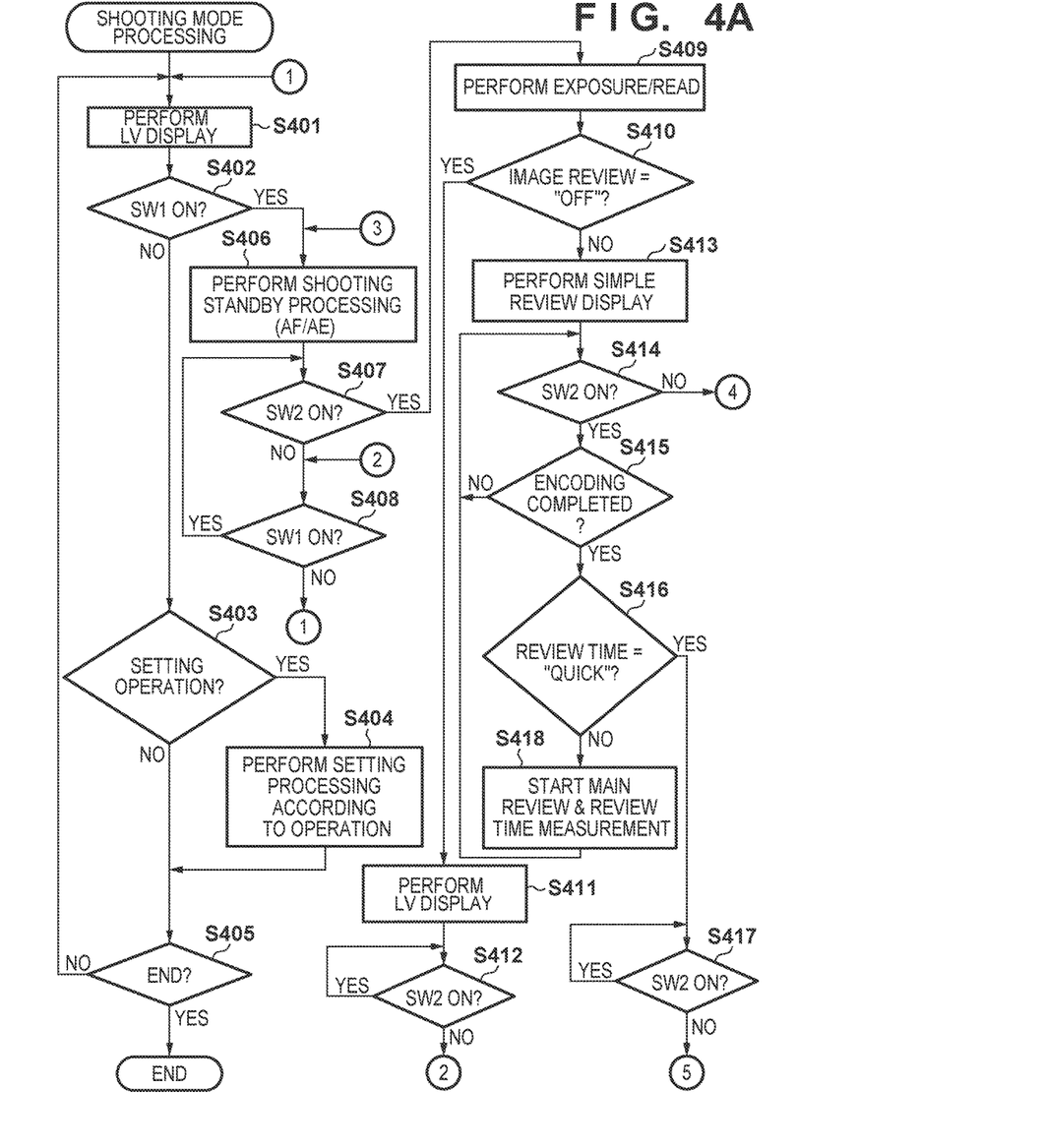
FIGS. 4A and 4B are flowcharts showing the shooting operation of the imaging apparatus according to the embodiment.
Figure 4B:
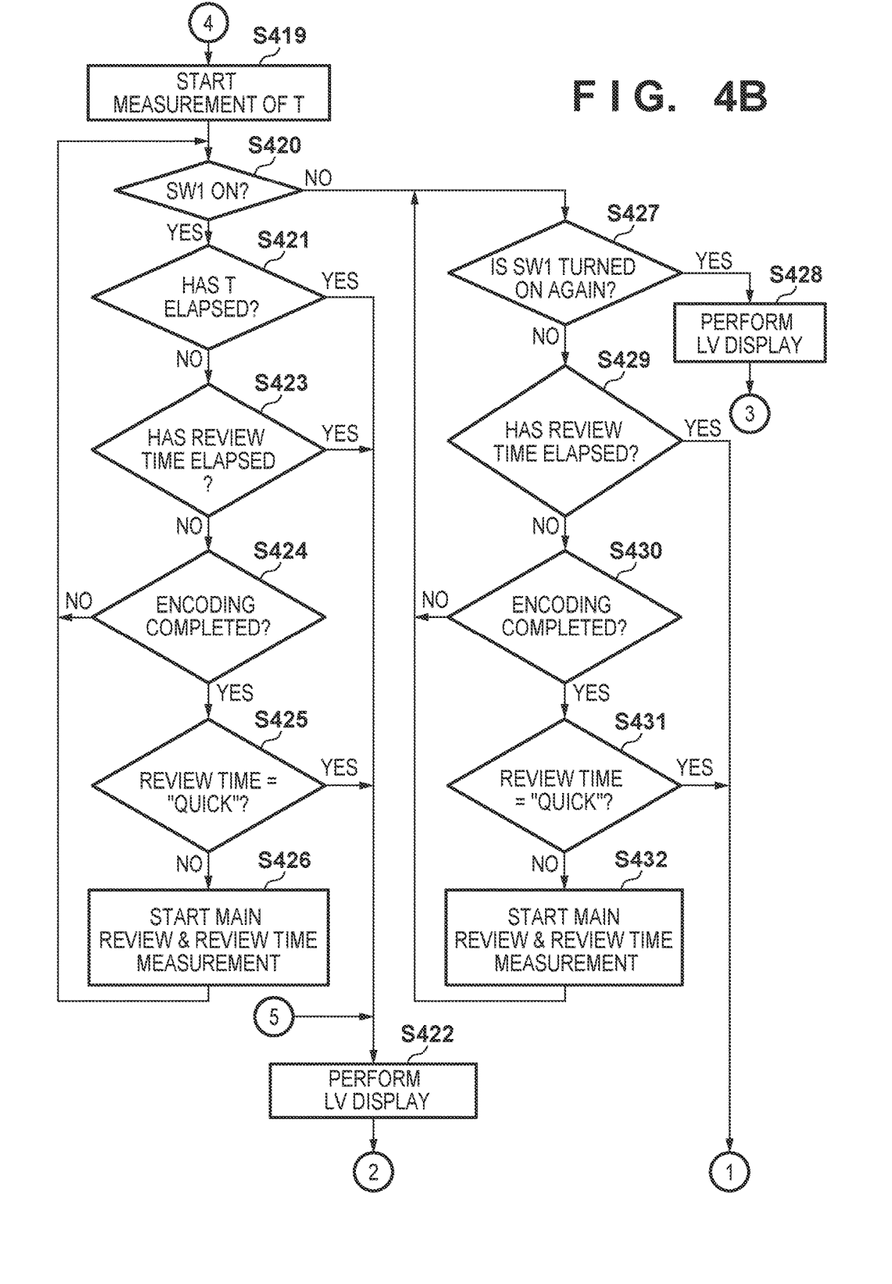

Shooting mode processing of the digital camera 100 according to the embodiment will be described next with reference to the flowcharts of FIGS. 4A and 4B. This processing is implemented when a program recorded in the nonvolatile memory 56 is loaded to the system memory 52 and executed by the system control unit 50. Note that the processing shown in FIGS. 4A and 4B is started when the digital camera 100 is activated in the shooting mode.

In step S401, the system control unit 50 controls the photographing lens 103, the shutter 101, and the barrier 102 to attain a state in which a subject image is projected onto the imaging unit 22. The system control unit 50 drives the imaging unit 22 and the image processing unit 24 and performs live view (LV display) on a screen of the display unit 28 while continuously processing AE/AF. The user can preview framing while seeing the live view display.

In step S402, the system control unit 50 determines whether SW1 is turned on (whether the shutter button 61 is pressed halfway). Upon determining that SW1 is turned on, the process advances to step S406. Otherwise, the process advances to step S403.

In step S403, the system control unit 50 determines whether a setting operation by the user is performed. More specifically, the system control unit 50 determines whether various kinds of setting operations are performed by the user from a menu screen opened by pressing the menu bottom included in the operation unit 70. Alternatively, the system control unit 50 determines whether a setting operation from a member other than the menu bottom configured to change various kinds of settings such as exposure, shutter speed, f-number, electronic flash, macro, self-timer, and shooting mode is performed. Upon determining that a setting operation is performed, the process advances to step S404. Otherwise, the process advances to step S405.

In step S404, the system control unit 50 performs setting processing according to the setting operation. For example, assume that an image review display setting is selected in the menu screen opened by pressing the menu button. In this case, a setting screen for the image review is displayed, and for example, three choices "off", "2 sec", and "quick" settable for the image review time are displayed. A setting selected by the user is recorded in the nonvolatile memory 56 as an image review setting. "Off" is a setting not to perform the image review. "Quick" is a setting to display only the simple review immediately after the shooting. "2 sec" is a setting to display the simple review immediately after the shooting and then display the main review for 2 sec after completion of development/encoding. Hereinafter, the "simple review" and the "main review" are collectively referred to as "image review" in the present embodiment.

Note that the above-described three choices concerning the image review are mere examples, and the choices are not limited to these. For example, in addition to the three choices, "3 to 10 sec (the number of seconds can arbitrarily be set)", "hold", and the like may be settable. Note that in "hold", the system control unit 50 continues the image review independently of the time from shooting and releases the image review if a returning operation to the live view (LV returning operation (for example, SW is turned on)) is performed by the user.

In step S405, the system control unit 50 determines whether an end event of the shooting mode processing has occurred. Examples of the end event are power-off and transition to another shooting mode such as the playback mode. If an end event has occurred, the processing ends. If no end event has occurred, the process returns to step S401 to repeat the processing.

In step S406, the system control unit 50 performs shooting standby processing such as AF and AE. At this time, the system control unit 50 switches the imaging unit 22 to the high speed thinning readout continuous drive suitable for AF. If continuous AF is not set, the focus position and the exposure setting set by the AF executed here are held as long as SW1 is held.

In step S407, the system control unit 50 determines whether SW2 is turned on (whether the shutter button 61 is pressed all the way down). If SW2 is turned on, the process advances to step S409. Otherwise, the process advances to step S408. In step S408, the system control unit 50 determines whether the ON state of SW1 is kept (whether the user keeps the shutter button 61 in the half stroke). If the ON state of SW1 is kept, the process returns to step S407, and the processes of steps S407 and S408 are repeated. If SW1 is turned off (the half stroke of the shutter button 61 is released), the process returns to step S401, and the system control unit 50 performs the live view display as a shooting standby screen.

In step S409, the system control unit 50 transits to a still image shooting operation, switches the imaging unit 22 to full-pixel readout, and performs exposure and a read operation, that is, actual shooting processing under the set exposure (the shutter speed and the f-number). The period in which the exposure is progressing is a blackout period in which no shot image is displayed on the display unit 28. As described above, the image processing unit 24 executes development almost in parallel to the read operation and records still image data in the memory 32, and simultaneously, records an image for the simple review in the memory 32.

In step S410, the system control unit 50 refers to the setting information in the nonvolatile memory 56 and determines whether the image review setting is set to "off". If the image review setting is set to "off", the process advances to step S411, and the system control unit 50 performs the live view without displaying a image review after the blackout period that is the display during the exposure and read in step S409.

Next, in step S412, the system control unit 50 determines whether the ON state of SW2 is kept (whether the user holds the shutter button 61 in the full stroke state since YES in step S407). If the ON state of SW2 is kept, the process remains in step S412. On the other hand, if SW2 is OFF (if the full stroke of the shutter button 61 is released), the process returns to step S408. At this time, if the ON state of SW1 is kept, the shooting conditions such as AE settings are kept in the locked state. If SW2 is turned on again without turning off SW1 (if the shutter button 61 is pressed all the way down without releasing its half stroke), shooting is executed using the shooting settings (parameters and the like) adjusted by the shooting standby process performed when SW1 is turned on first.

Upon determining in step S410 that the image review display setting is not "off" (that is, if the setting is "2 sec" or "quick"), the process advances to step S413. In step S413, the system control unit 50 displays the image for the image review display recorded in the memory 32 in step S409 on the display unit 28, thereby displaying the simple review. In this embodiment, the simple review display is executed during the period from completion of compression-coding (JPEG-coding) by the image processing unit 24 to generation of image data for the main review from the encoded data (the period until YES in step S415).

In step S414, the system control unit 50 determines whether the ON state of SW2 is held (whether the user keeps the shutter button 61 in the full stroke state since YES in step S407). If the ON state of SW2 is kept, the process advances to step S415. Otherwise (if the full stroke of the shutter button 61 is released), the process advances to step S419. Note that in the flowchart of FIG. 4A, after the simple review display in step S413, it is determined in step S414 whether SW2 is ON. However, if the exposure time of the shooting process started in step S409 is long, SW2 may be turned off before the end of the exposure/read in step S409. In such a case, the system control unit 50 advances the process to step S419 without waiting for the start of the simple review display (step S413).

In step S415, the system control unit 50 determines whether development/compression-coding processing by the image processing unit 24 for the image shot in step S409 is completed. Upon determining that the processing is completed, the process advances to step S416. Upon determining that the processing is not completed, the process returns to step S414. Note that if the development/compression-coding processing is completed, the image file of the compression-coded still image is recorded in the recording medium 200.

In step S416, the system control unit 50 refers to the nonvolatile memory 56 and determines whether the image review display setting is "quick". If the image review display setting is "quick", the process advances to step S417. On the other hand, in a case in which the image review setting is a setting other than "quick" (a case in which the image review setting is neither "off" nor "quick", and a fixed time such as "2 sec" is set or "hold" is set), the process advances to step S418.

In step S417, the system control unit 50 determines whether the ON state of SW2 is kept (whether the user holds the shutter button 61 in the full stroke state since YES in step S407). If the ON state of SW2 is kept, the process of step S417 is repeated. If the ON state of SW2 is not kept (if the full stroke of the shutter button 61 is released), the process advances to step S422. In step S422, the system control unit 50 switches the display of the display unit 28 from the image review to the live view, and returns the process to step S408.

In step S418, the system control unit 50 displays the image after the image shot in step S409 has undergone the development/compression-coding processing by the image processing unit 24 on the display unit 28 as the main review in place of the simple review. Measurement of the set time for the image review (the image review time (2 sec in this example) to perform the main review display) is started. That is, if the image review setting is "2 sec", the sum of the display time of the simple review (the time needed for development/encoding) and the display time of the main review (2 sec here) is the time of the image review display. Note that image display in the simple review and that in the main review hardly look different for the user. Even if the simple review displayed in step S413 is switched to the main review in step S418, there is no noticeable change for the user. In the main review display, the image review can be set in the hold state in accordance with a predetermined operation input using the operation unit 70. In addition, operations such as enlargement/reduction and deletion can be performed. In the simple review, these operations cannot be performed.

In step S419, in accordance with the OFF state of SW2 in step S414 (the release of the full stroke of the shutter button 61), the system control unit 50 starts measuring the predetermined time T to determine whether SW1 is in the hold state. The predetermined time T is a time of a length that makes it possible to determine that the user intentionally continues the half stroke of the shutter button 61 (50 msec or more), and is a time to prevent any delay in returning to the live view and performing the next shooting (less than 2 sec of the review time at maximum). The predetermined time T is preferably about 50 msec to 1000 msec (1 sec). In this embodiment, the predetermined time T=200 msec.

In step S420, the system control unit 50 determines whether the ON state of SW1 is held (whether the user keeps the half stroke of the shutter button 61). If the ON state of SW1 is kept, the process advances to step S421. If SW1 is OFF (the half stroke of the shutter button 61 is released), the process advances to step S427. Note that if SW1 is turned off, the process advances to step S427, the measurement of the predetermined time T is stopped, and the measured value is reset.

In step S421, the system control unit 50 determines whether the above-described predetermined time T has elapsed from the start of time measurement in step S419 (that is, whether the state in which the half stroke is held has continued for the predetermined time T after the release of the full stroke of the shutter button 61). Upon determining that the predetermined time T has elapsed, SW1 is determined to be in the hold state, and the process advances to step S422. Otherwise, the process advances to step S423.

In step S422, since the state in which the half stroke is held has continued for the predetermined time T after the release of the full stroke of the shutter button, the system control unit 50 determines that SW1 is in the hold state. The system control unit 50 thus determines that the user intends continuous shooting under the locked shooting conditions, interrupts the image review display on the display unit 28, and returns the display content to the live view. At this time, if SW1 is not OFF, the shooting conditions such as AF and AE are in the locked state (the settings are kept). Hence, if SW2 is then turned on without turning off SW1 (if the user presses the shutter button all the way down without releasing the half stroke), repetitive shooting using the parameters adjusted by the shooting standby operation performed when SW1 is turned on first can be performed. Upon determining that SW1 is in the hold state, the system control unit 50 returns the display content to the live view before the expiration of the set time (to be referred to as a review time=2 sec hereinafter) to perform the image review display (in this example, T=200 msec). As a result, the user can quickly check the subject and perform the next shooting while keeping the shooting conditions such as AF and AE.

In step S423, the system control unit 50 determines whether the review time (2 sec) has elapsed from the start of the main review. Upon determining that the review time has elapsed, the system control unit 50 ends the image review display and starts the live view display in step S422. Upon determining that the review time has not elapsed, the process advances to step S424.

In step S424, the system control unit 50 determines whether the compression-coding processing by the image processing unit 24 for the image shot in step S409 is completed. Note that step S424 ends with YES if the completion of the compression-coding processing is determined for the first time. Otherwise (if the compression-coding processing is not completed, or if the compression-coding processing is completed, and the main review and the review time measurement are already started), step S424 ends with NO. If YES in step S424, the process advances to step S425. If NO in step S424, the process returns to step S420. The processes of steps S425 and S426 are the same as the processes of steps S416 and S418.

In step S427, the system control unit 50 determines whether SW1 is turned on again during the image review display (whether the pressing of the shutter button 61 temporarily released during the image review display is performed again). Upon determining in step S427 that SW1 is turned on again, the process advances to step S428. In step S428, the system control unit 50 stops the image review display, returns the display content to the live view, and returns the process to step S406. In step S406, the system control unit 50 re-executes the shooting standby processing.

Upon determining in step S427 that SW1 is not turned on, the process advances to step S429. The processes of steps S429, S430, S431, and S432 are the same as the processes of steps S423, S424, S425, and S426. However, upon determining in step S429 that the review time has elapsed, the system control unit 50 returns the process to step S401. In step S401, the system control unit 50 ends the image review display, executes the live view display, and returns the digital camera 100 to the shooting standby state. Note that in this embodiment, the measurement of the review time is started in accordance with the start of the main review display (step S418, S426, or S432). If the image review display is stopped according to the elapse of the review time in step S423 or S429, the main review display is performed for the set time. Hence, the image review display including the simple review display is performed for a time longer than the set time. Control of the image review display period is not limited to this form, as a matter of course. The review time measurement may be started in accordance with the start of the simple review display (step S413). That is, if the image review display is stopped according to the elapse of the review time in step S423 or S429, the image review display is performed for the set time or more.

According to the above-described processing shown in FIGS. 4A and 4B, if the half stroke of the shutter button 61 is held after shooting, and the hold state is detected, the display unit 28 quickly returns the display content to the live view. For this reason, shooting under the same shooting conditions (AF and AE) can repetitively be performed at a shutter timing desired by the user. That is, according to the user's intention to repetitively perform shooting (the above-described continuous shooting) while keeping the shooting conditions, the operation can quickly switch to the operation with priority to the viewfinder function, and the convenience improves.

On the other hand, if the half stroke of the shutter button is temporarily released (NO in step S420) and then turned on again (YES in step S427) during the display period of the image review display, the system control unit 50 starts the live view display (step S428) and performs shooting standby processing (AF and AE). For example, if the user confirms a shot image in the image review display and recognizes defocusing, the display unit 28 can immediately be returned to the live view by pressing the shutter button 61 halfway. This allows the user to quickly redo AF and shoot an image.

As long as the full stroke of the shutter button is continued in the image review display state (YES in step S414 or S417), the image review display continues independently of the set time (review time). That is, the user can keep the image review display and deliberately confirm the shot image by keeping the full stroke state of the shutter button 61.

Figure 5:
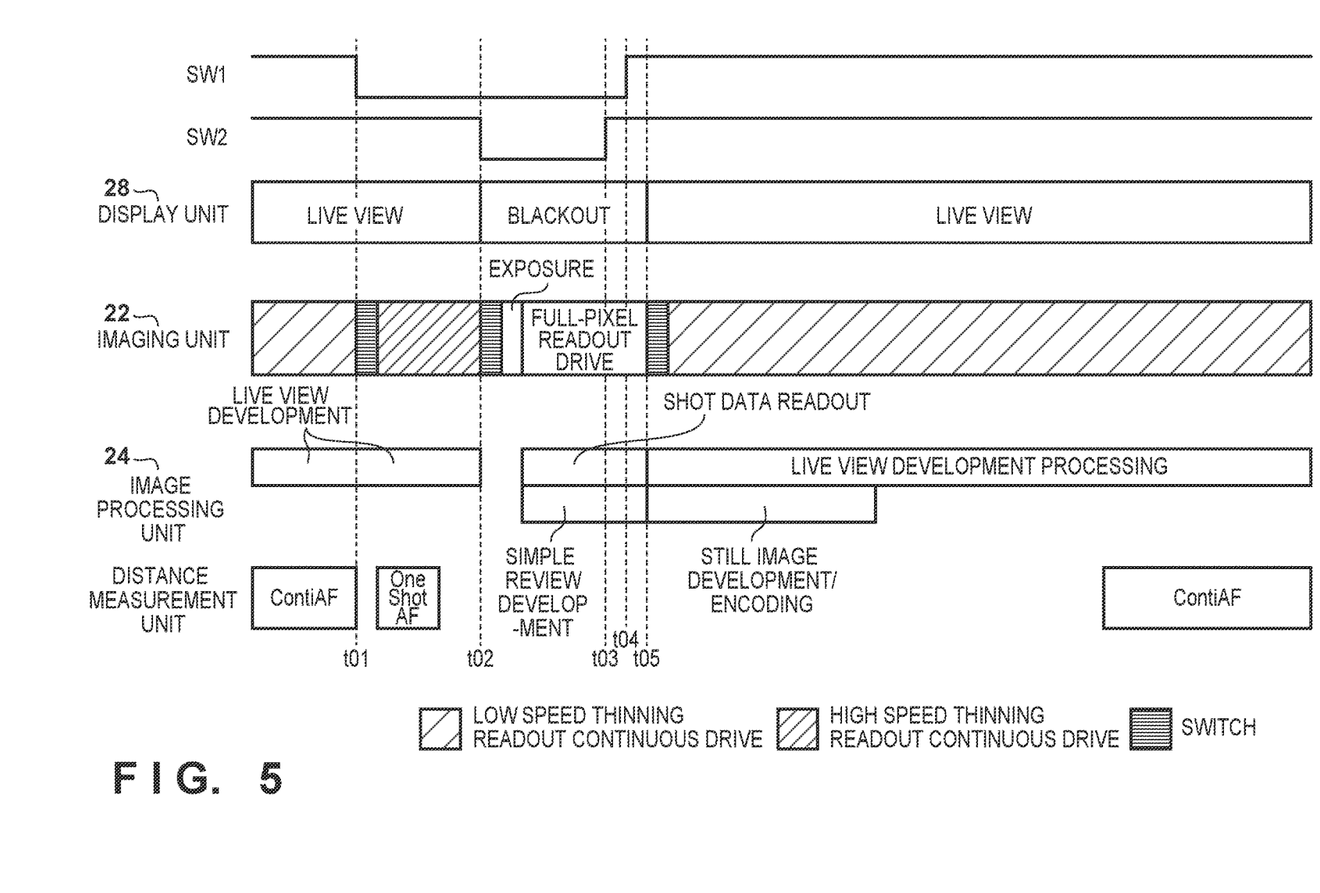
FIGS. 5 to 7 are timing charts showing the shooting operation of the imaging apparatus according to the embodiment.

To deepen the understanding of switching control between the live view display and the image review display, a description will be made with reference to the timing charts of FIGS. 5 to 7. FIG. 5 is a timing chart of an operation of the digital camera 100 according to the embodiment performed when the image review display setting is "off". When SW1 is turned on at time t01, the system control unit 50 switches the drive of the imaging unit 22 to high speed thinning readout and performs AF (One Shot AF). When SW2 is turned on at time t02, the system control unit 50 executes shooting (exposure and full-pixel readout) and changes the display of the display unit 28 to blackout. When SW1 and SW2 are turned off at times t03 and t04, and read of shooting data is completed at time t05, the system control unit 50 returns the display content of the display unit 28 to the live view because the image review setting is "off" (step S409, YES in step S410, and step S411). Note that in the timing chart of FIG. 5, the period (t05-t04) after SW2 is turned off until SW1 is turned off is shorter than the predetermined time T, and the system control unit 50 does not determine that SW1 is in the hold state.

Figure 6:
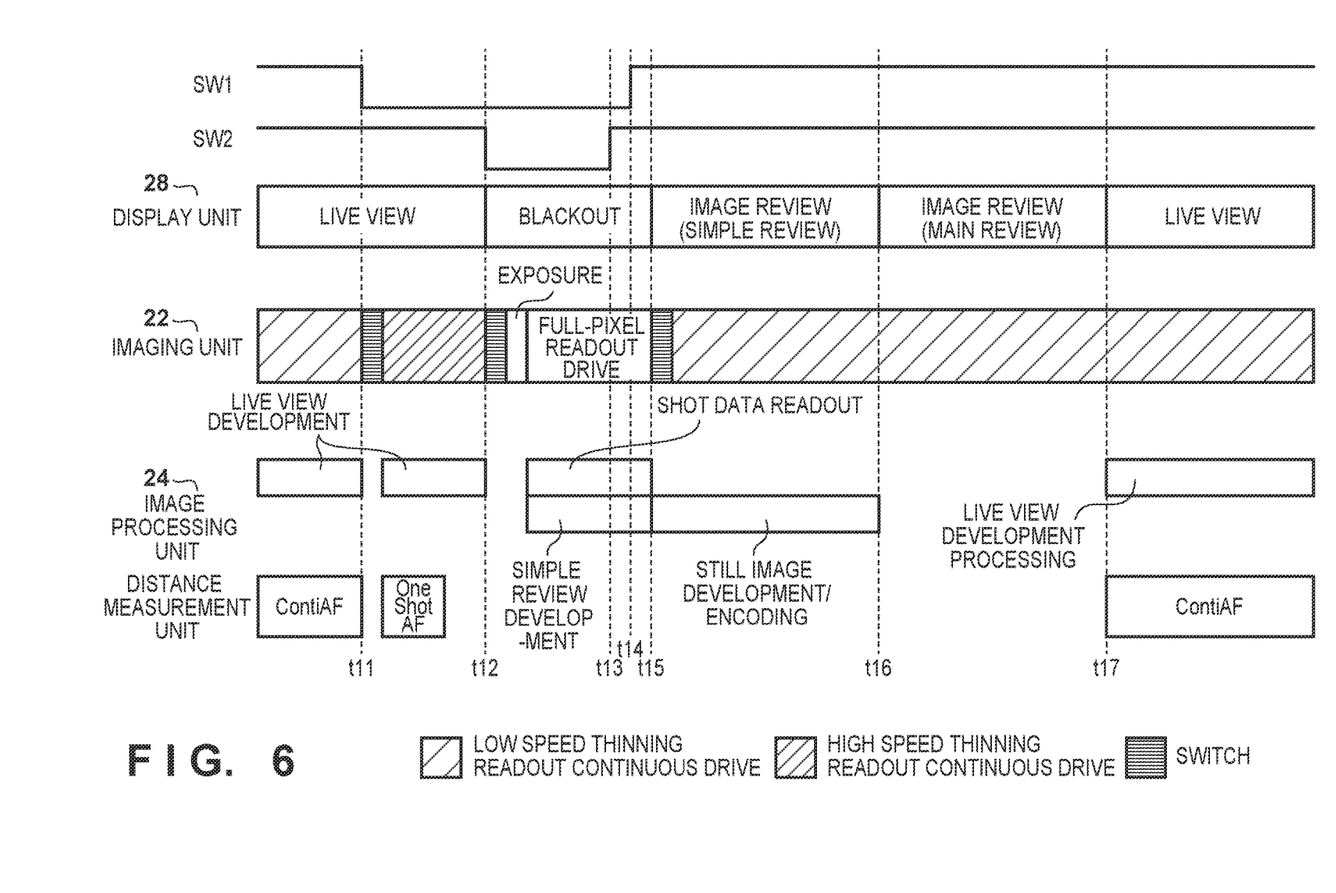

FIG. 6 is a timing chart of an operation of the digital camera 100 performed when the image review display setting is "2 sec", and the shutter button 61 is released (the half stroke is also released) quickly (before the elapse of the predetermined time T) after shooting performed by turning on SW2. The operations at times t11 and t12 are the same as the operations at times t01 and t02 in FIG. 5. Since SW2 is turned off at time t13, measurement of the predetermined time T is started. However, before the predetermined time T elapses, SW1 is turned off (the half stroke of the shutter button 61 is canceled) at time t14. Hence, when read of shooting data is completed at time t15, the system control unit 50 starts the simple review display. After that, when development/encoding is completed at time t16, the system control unit 50 switches the display of the display unit 28 to the main review display. When the review time (2 sec) elapses (t17) from the switching to the main review display, the system control unit 50 returns the display content of the display unit 28 to the live view.

Figure 7:
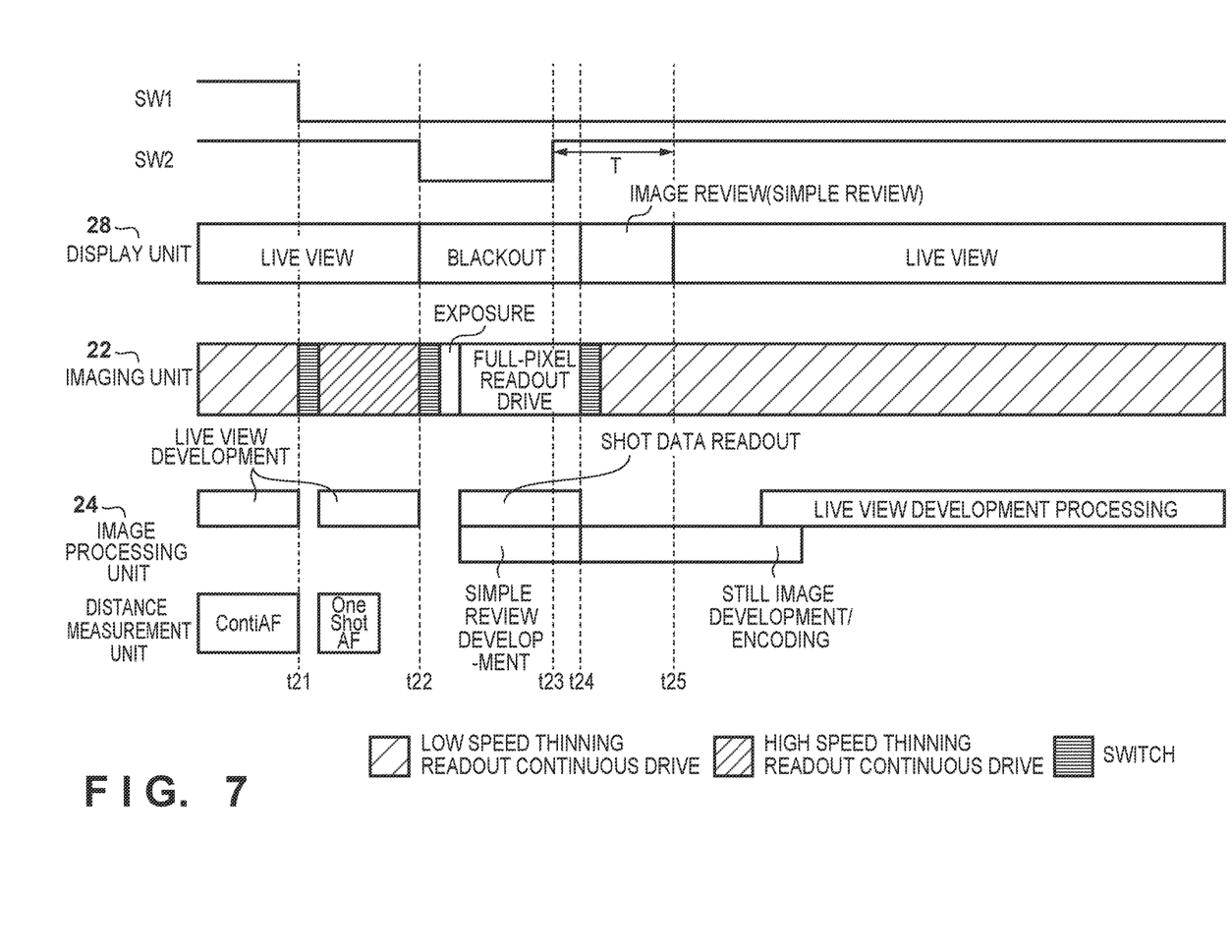

FIG. 7 is a timing chart of an operation of the digital camera 100 performed when the image review display setting is "2 sec", and the half stroke of the shutter button 61 is held without releasing after shooting performed by turning on SW2. The operations at times t21 and t22 are the same as the operations at times t01 and t02 in FIG. 5. When SW2 is turned off at time t23, measurement of the predetermined time T is started. Here, the measurement of the predetermined time T continues during the time in which the full stroke of the shutter button 61 is released, and the half stroke state is kept. When read of shooting data is completed at time t24, the simple review display is started. Since the predetermined time T elapses at time t25 while keeping the ON state of SW1 (while keeping the half stroke of the shutter button 61), the system control unit 50 detects the hold state of SW1. According to the detection of the hold state, the system control unit 50 interrupts the image review display on the display unit 28 and returns the display content to the live view even before the elapse of the review time (2 sec).

Note that in the examples described with reference to FIGS. 4A, 4B, and 5 to 7, the simple review display is always performed in step S413 if the image review display setting is a setting other than "off" (NO in step S410). However, if the exposure time for shooting is long, SW2 may be turned off during execution of exposure/read in step S409, and the predetermined time T may elapse during the blackout period. In such a case, the system control unit 50 may perform the simple review display during a period shorter by the set time (review time) of the image review display and immediately return the display content to the live view. This allows the user to confirm that shooting in step S409 is performed and completed.

For example, if the predetermined time T elapses during the blackout period, the system control unit 50 may perform the simple review display for a time of at least one frame (at least $1/30$ sec if the screen is updated at 30 fps). Alternatively, if the predetermined time T elapses during the blackout period, the system control unit 50 may perform the simple review display for a time corresponding to the processing time after completion of exposure/read in step S409 until the system control unit returns to the live view display. The processing time until the system control unit returns to the live view display includes, for example, a standby time necessary for the imaging unit 22 to switch to the live view display. According to this control, the image review display can be performed without prolonging the time until returning to the live view display. Note that if the predetermined time T elapses during the blackout period, the display may be returned to the live view display without displaying the simple review.

According to the above-described embodiment, even when performing the image review display to confirm a shot image while keeping the shooting standby operation after shooting, the subject can quickly be confirmed for the next shooting. When locking the shooting conditions and performing continuous shooting, display control to appropriately switch between the image review display to confirm a shot image and the live view display for the viewfinder function is implemented. That is, when locking the shooting conditions and performing continuous shooting, both shot image confirmation by the user and the shortening of the live view display disappearing time can be implemented.

Note that the control of the system control unit 50 may be performed by one piece of hardware, or the overall apparatus may be controlled by causing a plurality of pieces of hardware to share the processing. In the above embodiment, the simple review is displayed first in the image review display, and the main review is displayed after the end of encoding of the shot image. However, the present invention is not limited to this. The simple review display may be continued even after completion of encoding of the shot image.

The present invention has been described above in detail based on the preferred embodiments. However, the present invention is not limited to these specific embodiments and can incorporate various forms without departing from the scope of the present invention. The above-described embodiments are merely examples of the present invention and can also appropriately be combined.

In the above embodiments, an example in which the present invention is applied to an imaging apparatus (digital camera) has been described. However, the present invention is not limited to this example and is applicable to any electronic device including an imaging unit. That is, the present invention is applicable to a personal computer including an imaging unit and a display unit, a PDA, a mobile phone terminal, a portable image viewer, a music player, a game machine, an electronic book reader, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-021235, filed Feb. 5, 2016, which is hereby incorporated by reference herein in its entirety.

What is claimed is:

1. An electronic device comprising:
    an imaging unit configured to capture image;
    an operation unit configured to receive a first operation to set a shooting parameter for capturing image and a second operation to capture image based on the shooting parameter and write data based on the captured image in a recording medium; and
    a display control unit configured to display, on a screen, image review based on the captured image after capturing image response to the second operation and then display live view which is generated by continuously capturing image,
    wherein a period of displaying the image review is shorter if the first operation is detected successively after finishing detecting the second operation than if the first operation is not detected successively after finishing detecting the second operation.

2. The device according to claim 1, wherein the period of displaying the mage review is shorter if the first operation is kept during a predetermined period.

3. The device according to claim 1, wherein the set shooting parameter is held while the first operation is kept.

4. The device according to claim 1, wherein the display control unit continues displaying the image review and does not start displaying the live view, while the second operation is detecting.

5. The device according to claim 1, wherein the period of displaying the image review is shorter than a predetermined time set by a user.

6. The device according to claim 1, wherein in the image review display, the display control unit first performs displaying simple review using display image data generated in a process of developing data read from the imaging unit, and when encoded data is generated, performs displaying main review using display image data generated from the encoded data.

7. The device according to claim 6, wherein if a first mode set for the image review, the display control unit performs displaying the main review for the set time.

8. The device according to claim 6, wherein if a second mode is set for the image review, the display control unit ends displaying the image review in accordance with completion of the generation of the encoded data.

9. A method of controlling an electronic device including an imaging unit configured to capture image, the method comprising:
    receiving, via an operation unit, a first operation to set a shooting parameter for capturing image;
    receiving, via the operation unit, a second operation to capture image based on the shooting parameter and write data based on the captured image in a recording medium; and
    displaying, on a screen, image review based on the captured image after capturing image in response to the second operation and then display live view which is generated by continuously capturing image,
    wherein a period of displaying the image review is shorter if the first operation is detected successively after finishing detecting the second operation than if the first operation is not detected successively after finishing detecting the second operation.

10. A non transitory computer-readable storage medium storing a program fir causing a computer to execute a method of controlling an electronic device including an imaging unit configured to capture image, the method comprising:
    receiving, via an operation unit, a first operation to set a shooting parameter for capturing image;
    receiving, via the operation unit a second operation to capture image based on the shooting parameter and write data based on the captured image in a recording medium; and
    displaying, on a screen, image review based on the captured image after capturing image in response to the second operation and then display live view which is generated by continuously capturing image,
    wherein a period of displaying the image review is shorter if the first operation is detected successively after finishing detecting the second operation than if the first operation is not detected successively after finishing detecting the second operation.

* * * * *